Patented Jan. 10, 1950

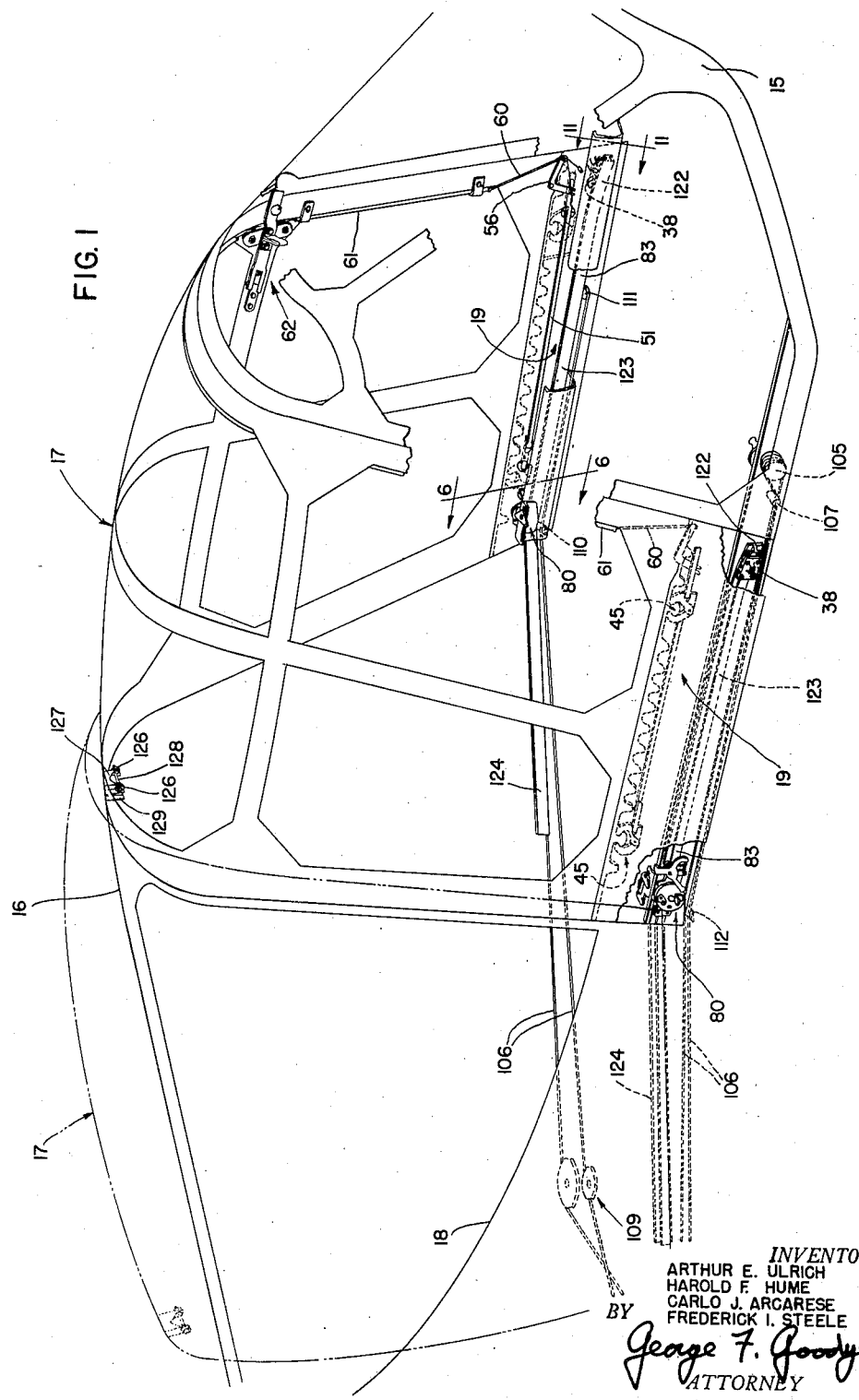

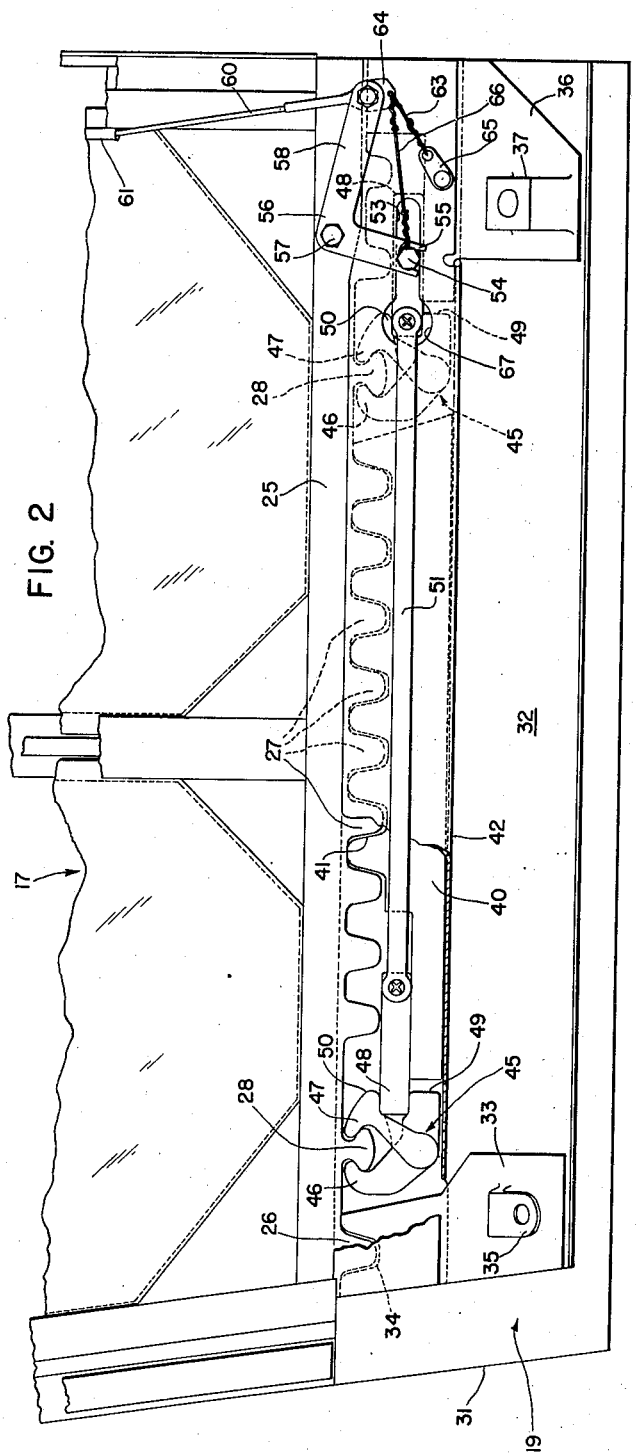
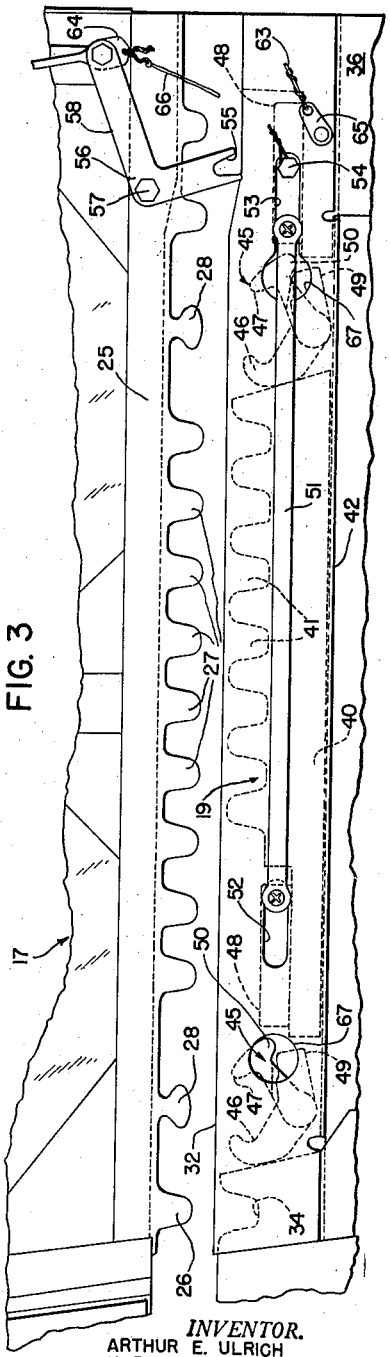

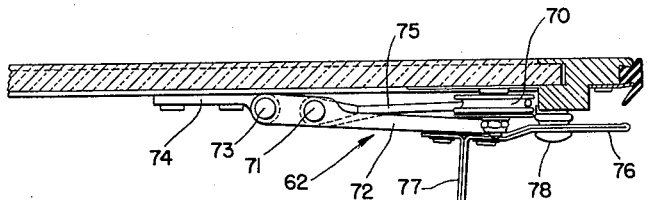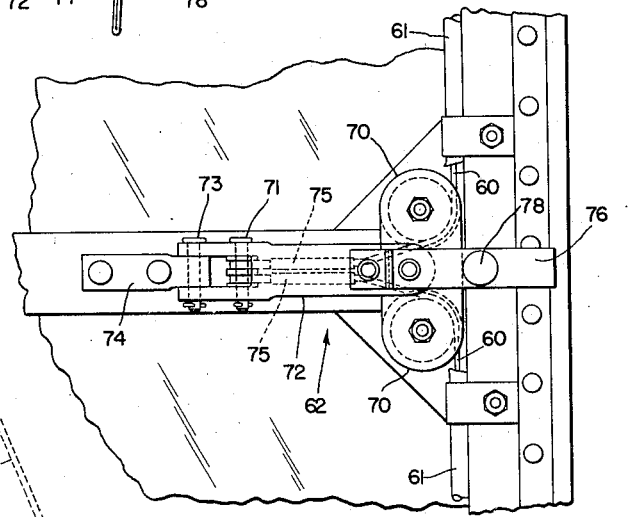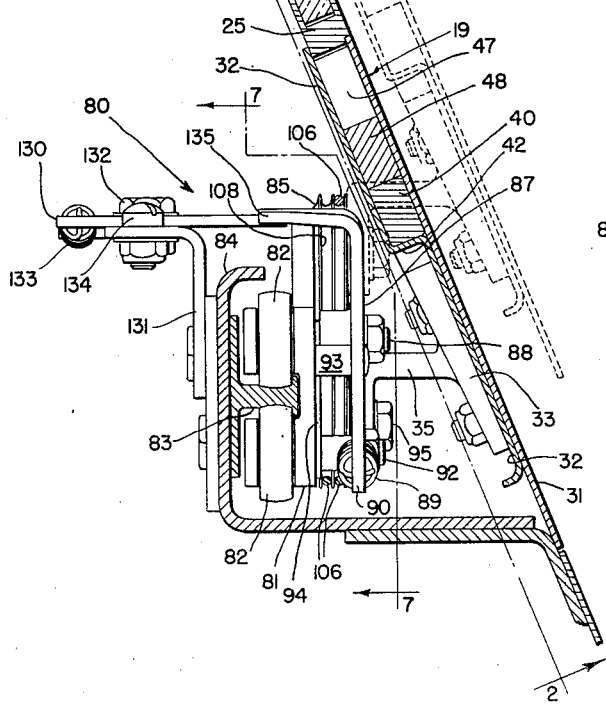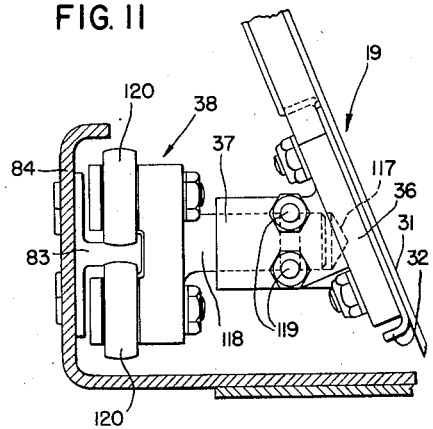

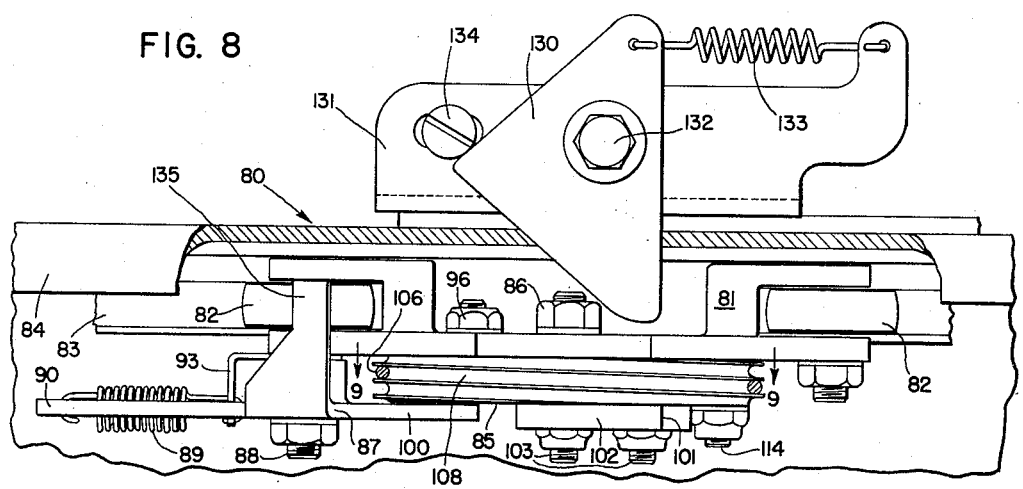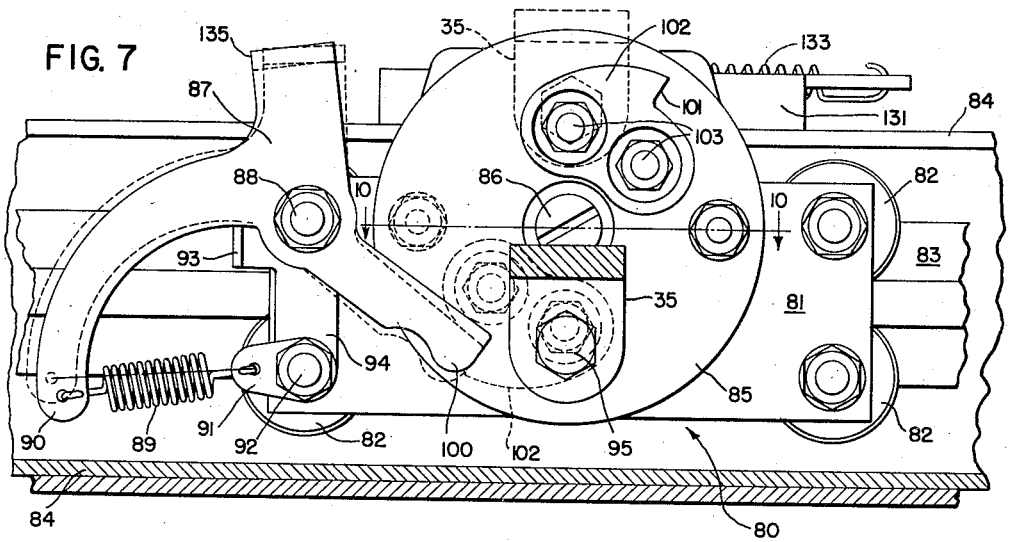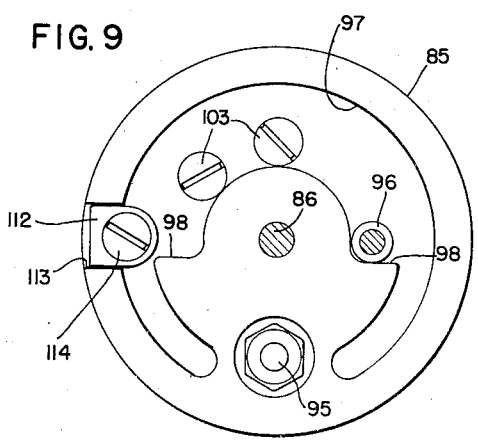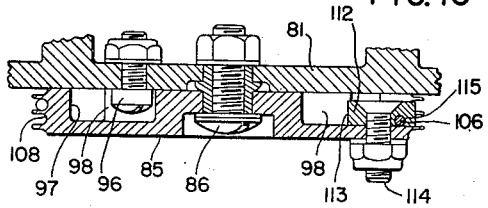

2,493,904

UNITED STATES PATENT OFFICE 2,493,904

AIRCRAFT CABIN ENCLOSURE AND MOUNTING MEANS THEREFOR

Arthur E. Ulrich, Buffalo, and Harold F. Hume and Carlo J. Arcarese, Cheektowaga, and Frederick I. Steele, Snyder, N. Y., assignors to Curtiss-Wright Corporation, a corporation of Delaware Application May 28, 1945, Serial No. 596,258

13 Claims. (Cl. 244—121)

The present invention relates to aircraft construction and is particularly concerned with improved mounting arrangements for a cockpit closure together with means for opening and closing the latter as well as release means whereby the same may be jettisoned.

One of the general objects resides in the improved arrangement for mounting a cockpit closure in a flush relation with adjacent portions of the aircraft structure so that its resistance or drag may be reduced especially when the same is used on the present high performance aircraft.

In carrying out the above stated object it is a particular object to provide closure operating means of greatly improved and simple type for facilitating the opening and closing of the closure structure with the aircraft either in flight or on the ground.

Another object is to be found in the arrangement and disposition of the operating means so that certain mechanical advantages are provided for improving the ease of movement of the closure especially when subject to slipstream forces.

Yet another object is exemplified by the structural arrangement employed in initially assembling the closure means whereby the same may be firmly secured on the aircraft but easily and quickly released should the occasion demand that the closure be jettisoned.

Additional objects and consequent advantages will become evident after the presently preferred construction, as disclosed in the accompanying drawing, is more fully described and made known.

In the drawing:

Figure 1 is a fragmentary perspective view of the aircraft showing the fuselage cockpit closure structure in which certain parts of the latter have been broken away, it being noted also that the phantom outline of the closure illustrates its fully open position.

Figure 2 is an enlarged but fragmentary elevational view of the means for releasably attaching the closure to the aircraft together with the jettison mechanism, the view being seen from the interior of the cockpit along the line 2—2 of Figure 6 and toward the left side as viewed by the pilot when seated.

Figure 3 is a fragmentary view similar to that of Figure 2 but illustrating the closure holding and jettison mechanism in released position and the resulting upward movement of the closure due to slip-stream forces.

Figure 4 is an enlarged but fragmentary plan view of the jettison control lever as seen at the upper left front edge of the cockpit closure when viewed by the pilot, the disclosure being a specific detail of the showing in Figure 1.

Figure 5 is an elevational view of the jettison lever control of Figure 4.

Figure 6 is a fragmentary sectional elevation of the cockpit closure actuating mechanism for moving the same upwardly (dotted outline) and then rearwardly to open the cockpit, the section being taken along line 6—6 of Figure 1.

Figure 7 is a further partial sectional elevation of the mechanism of Figure 6 taken at line 7—7 thereof.

Figure 8 is a top plan view of the mechanism shown in Figure 7.

Figure 9 is a detailed sectional elevation of a portion of the mechanism seen in Figures 7 and 8 but taken along the line 9—9 in Figure 8.

Figure 10 is a sectional detail taken at line 10—10 in Figure 7.

Figure 11 is a partial sectional end elevation of the truck means seen at line 11—11 in Figure 1.

The general arrangement of the cockpit closure means for aircraft is illustrated in Figure 1 in which the fuselage is formed to provide a windshield structure 15 and a rearwardly spaced turnover structure 16 tapering gradually rearwardly from the closure means 17 and having rear vision notches 18. The full line showing of the closure is illustrative of its flush fit position over the cockpit, while the phantom outline indicates its fully retracted position over the turnover structure 16. The closure is movably and releaseably secured to the aircraft along each of its sides by skirted carriages 19 the full details of which will be described presently.

With this brief description in mind reference will now be made to Figures 2 and 3 where the closure 17 is shown secured to the carriage 19. The closure is provided at each side with an elongated member 25 the lower edge of which is formed with depending lugs and teeth. In this arrangement the tooth 26 acts as an alignment element, the series of teeth 27 are side load and shear resisting elements while the spaced lug elements 28 are locking elements as will be described presently. The carriage structure comprises; an outer skirt or panel 31, an inner flanged stiffener member 32, a rearward bracket 33 in which a socket or notch is formed at 34 to receive the alignment tooth 26 and on which is arranged an angle boss 35 for mounting the rearward truck and elevating means to be noted hereinafter, and a forward bracket 36 formed with a boss 37 for mounting the forward truck shown in Figure 1 at 38 and in more detail in Figure 11. Between the brackets 33 and 36 is secured the member 40 which is notched at 41 to receive the tooth elements 27 of member 25. In this arrangement the member 32 is suitably formed or joggled at 42 so that its upper section is spaced from the outer skirt 31 to provide a channel in which the member 40 is mounted. At either end, however, the joggled portion of this stiffener 32 is cut out to permit the upper portions of the brackets to extend upwardly into the same channel with member 40 for coplanar assembly.

It will be noted that the lugs 28 on the member 25 occupy channel areas at each end of the cooperating shear members 25 and 40 and that each of the lugs is adapted to be gripped by tong-like clamps 45. These clamps are substantially identical and comprise a first element 46 and a cooperating second element 47, each of which is suitably notched so as to be pivotally mounted on a common axis for coplanar movement into clamping relation with the lug 28 as shown in Figure 2, or for movement to release the lugs as in Figure 3. The tong elements 46 and 47 are adapted to be locked in clamped relation by a key element 48, the nose of which rides between a tailpiece 49 of element 46 and an overhanging projection 50 of element 47. Unlocking movement of each of these keys 48 is accomplished simultaneously by means of a draw bar 51 attached to the rear one of the keys (to the left in Figure 2) by means of a suitable pin which moves in a slot 52 cut into the stiffener member 32 (see Figure 3). The forward end of the draw bar is also pin connected to the forward one of the keys and this pin moves in a slot 53. The last mentioned key element is also provided with a threaded stud 54 which projects through the slot 53 for engagement in the slotted end 55 of a bell crank 56 in turn pivotally mounted on the frame member of the closure structure 17 as at 57. The operating arm 58 of the crank 56 is connected to a draw cable 60 which is conducted by a tubular guide 61 upwardly along the closure arch to a release lever means 62 later to be described.

Since the above mechanism is intended for operation when the closure 17 is to be jettisoned, usually by slip stream forces when in flight, the bell crank 56 is lock wired in position for holding the locking keys 48 in the positions shown in Figure 2. For this purpose a soft bronze wire 63 is attached to a tab end formed on the draw cable fitting 64 and to a link 65 carried on the member 32. In addition a similar wire 66 is attached to the tab on fitting 64 and to the stud 54 for the purpose of preventing the latter from unthreading due to vibration or for other causes. An additional precaution is taken to make certain that the tong-like clamps 45 are effectively gripping the lugs 28 by providing peep holes 67 in the member 32 over the area of engagement between the keys 48 and the several parts of the clamps 45. Thus the proper locking position of the tong elements and key may be noted by visual inspection.

The foregoing discussion has dealt with the closure and carriage assembly for the left hand side of the cockpit. The right hand side is of course arranged oppositely but constructed similarly to that already disclosed and hence no particular discussion is deemed necessary.

Each of the bell cranks 56 (Figure 1) for effecting release of the closure 17 at its four points of securement by cooperation between tong-like clamps 45 and lugs 28 is operated by a draw cable 60 which extends upwardly along the closure arch through guide tube 61 to a common quick acting release generally indicated at 62. The latter means 62 is shown in detail in Figures 4 and 5 where it can be seen that the cables 60 are passed around suitably mounted but separate pulleys 70 for anchorage at a common pin element 71 carried by a lever means 72 which is pivoted at 73 in a fixed bracket 74 mounted to the closure frame. The lever is bifurcated at its pivoted end to embrace the bracket and to permit cable end fittings 75 to be inserted for receiving the anchor pin 71. The opposite and flattened end of the lever carries a fabric element 76 which is secured thereto on each side of an upstanding pull tab 77. The forward portion of the fabric element is held down by a snap button 78 of any well known type for the purpose of maintaining the lever in non-released position as shown. When it is desired to jettison the closure 17 the pilot of the aircraft simply pulls on the tab 77 unsnapping the button 78 and pivoting the lever 72 whereby both cables 60 are drawn up sufficiently far to pivot the bell cranks 56, break the lock wires 63 and 66 and withdraw the keys 48 as previously explained.

Referring now to Figures 6 through 10 the details of one of the rear truck and closure elevating assemblies will now be described. It is of course understood that two such assemblies are employed and that the one not so shown in detail is identical but oppositely arranged. Thus each of these assemblies, generally indicated at 80 in Figure 1, includes a truck frame 81 suitably formed to mount four roller elements 82 which in turn engage and ride on a guide or track 83 suitably mounted on a longéron member 84, a cable drum 85 pivotally mounted by a shaft means 86 near the longitudinal center of the truck frame 81, a drum locking means 87 pivoted on the shaft 88 for one of the upper roller elements 82, and a spring 89 connected to an arm 90 of the means 87 and to a tab element 91 mounted on roller element shaft 92 such that the means 87 is urged in a counterclockwise direction and against a stop arm 93 which is part of a plate element 94 secured to the truck at the roller shafts 88 and 92 in the manner shown. This assembly 80 is movable as a unit along the track 83 and in so doing transports the carriage 19 and attached closure 17. However, the closure 17 is seated in flush position over the cockpit and must be elevated sufficiently so that its rear margin will first be clear of the turn over structure 16 before it can be moved to open position (phantom outline in Figure 1).

The closure elevating and moving operation is accomplished by means now to be described. The rotatable cable drum 85 is eccentrically pivotally connected at 95 to the boss formation 35 of bracket 33 so that with the cockpit fully closed the connection between the drum and bracket will fall below the drum pivot (see Figure 7). All other parts and element in this view are shown in full line for the fully closed condition of the cockpit. Accordingly, rotation of the drum 85 in a counterclockwise direction, by means later to be described, will move the carriage bracket 33 upwardly and since the closure is incapable of longitudinal movement at this time the truck 81 must roll along the track 83 to some extent to compensate for the vertical rise of the connecting pivot element 95. The drum size is determined by the required elevating travel of the closure for clearance at the turn over structure, while drum travel is limited to substantially 180° of rotation from the full line position of the carriage mount 35 in Figure 7 to the elevated, dotted outline, position. This is accomplished by the provision of a stop element 96 fixed in the truck frame and extended into a recess 97 formed in the rear surface of the drum (Figures 9 and 10). The recess is partly defined by a pair of shoulders 98 against which the stop element 96 bears at either of its limiting positions. The showing in Figure 9 corresponds to the full line position of the several parts in Figure 7 at which time the closure is fully seated over the cockpit. Thus when the closure has been fully elevated by drum rotation which moves the boss 35 to its dotted outline position (Figure 7) the stop 96 will bear against the opposite shoulder 98 from that shown in Figure 9.

When the closure is elevated in the manner above noted, the locking means 87 will automatically operate to secure the drum against reverse rotation until it is so desired as will later appear. The locking means 87 is provided with an arm 100 which is adapted to engage in the notch 101 of a cam-like catch 102 when the drum is rotated in a counterclockwise direction (Figure 7) from its closed position to its open position, as above explained. The locking means when so associated with the catch assumes the dotted outline position. The catch 102 is suitably fixed on the face of the drum by a pair of threaded elements 103, the heads of which are countersunk so as to lie flush with the bottom surface of the recess 97 as indicated in Figure 9.

The operation of the elevating means as well as translation of the truck 81 is effected by a run around cable system which is operated from a single crank and drum means 105 (Figure 1) mounted at the right hand forward zone of the cockpit. The cable 106 extends from the upper surface of the crank drum under an idler pulley 107 and rearwardly within the longéron 84 to the cable drum 85 of the right hand assembly 80 where it is wrapped a full turn in a helical groove 108 (Figure 10) before passing rearwardly to one of a pair of pulleys (not shown) set in the rear of the turn over structure. From this pulley (not shown) the cable crosses over the fuselage to the lower one of a second pair of pulleys 109 and then runs forward over a fixed guide element 110 set slightly below and to the rear of the assembly 80 to a pulley 111. The cable returns to the left hand assembly 80 and is wrapped one full turn around the associated cable drum 85 before passing rearwardly to the upper one of the pair of pulleys 109. At this point the upper cable crosses over the lower cable as shown and rides on the lower one of the first mentioned pair of pulleys (not shown) whereupon it runs forward over a fixed guide 112 and back to the crank drum 105 to form a closed cable run around system. Thus when the crank drum is rotated counterclockwise as viewed in Figure 1, and with the assemblies 80 in position to maintain the closure in seated position, the cable drums 85 are simultaneously rotated in a clockwise sense, as viewed in Figure 1 (counterclockwise in Figure 7), so that the respective carriages 19 are elevated in the desired manner to elevate the closure 17 at its rear margin. After one half revolution of the cable drums 85, as determined by the stop element 96, the locking means 87 snap into notches 101 of the catches 102 to prevent reverse rotation thereof. Thus the cable drums are effectively immobilized and become a fixed part of the trucks 81. The assemblies 80 are now conditioned to act as translatory truck units for moving the closure rearwardly to open the cockpit upon continued counterclockwise rotation of the crank drum 105.

As shown in Figures 9 and 10 the cable 106 is clamped to the drum 85 by means of a clamp block 112 inserted in a conformed notch 113 near the periphery thereof and held by a countersunk screw element 114. The block is itself notched at 115 to receive the cable and press it against an opposed surface on the drum.

In order that the carriages and the closure may be elevated at the rear margin in the aforementioned manner it is preferred to have each of the forward trucks 38 support the carriage means 19 on a suitable pivot. For this purpose (Figure 11) the bracket boss 37 is apertured at 117 to receive a pivot forming element 118 integral with the truck. This pivot is locked against axial movement by a pair of tangential locking pins 119 as is well understood in the art. The truck is equipped with four roller means 120 which engage the track 83 for guiding the forepart of the closure 17 during its movement. The forward truck shown in Figure 11 is duplicated at each side of the closure.

It is to be further noted in Figure 1 that the tracks 83 at each side of the cockpit are enclosed or hidden by the longéron members 84 so that the trucks 81 and 38 are not exposed to the interior. Also it is of interest to note that the arrangement of the carriage skirt 31 is effective for enclosing or protecting the trucks from exterior exposure. In the preferred construction each of the tracks 83 is formed to provide an upwardly inclined fore section at 122, an intermediate substantially horizontal or constant grade section 123 and a downwardly directed trailing section 124. Thus, after the closure has been elevated at its rear margin by assemblies 80, its subsequent translatory movement will cause the forward portion of the closure to rise on the track sections 122. After a short travel the rear of the closure will descend on track sections 124 but the forward portion will maintain its elevated condition such that it will be clear of the turn over structure 16.

During the elevating operation of the assemblies 80 the upper rear zone of the closure is guided in its upward movement by a pair of roller elements 126 carried on the closure by a bracket 127 and shaft 128. The turn over structure 16 is provided with a pair of short and slightly vertically inclined track elements 129 for cooperation with the rollers 126. This guide assembly reduces friction forces and also prevents rearward movement of the closure until the rollers are clear of the track 129. Moreover, during the closing movement of the closure 17 and especially during the descent thereof, under the action of assemblies 80 as will appear presently, the tracks 129 will force the closure into a snug fit at the forward margin due to their slight inclination from the vertical.

What has been said heretofore will suffice to explain the operation and function of the several parts and elements of the apparatus as the same cooperate to move the closure toward open position. It is also clear that by rotating the crank drum 105 in a clockwise direction, as viewed in Figure 1, the cable pull will cause trucks 81 to roll forward for returning the closure 17. When the rear margin of the closure reaches a position nearing registry with the margin of the turn over structure the cable drum locks 87 are lifted out of the respective notches 101, as will appear presently, thus freeing the cable drums for relative rotation in a counterclockwise direction through one half revolution or until the respective stop elements 96 strike the opposite shoulders 98 in the recess 97. The pull in the cable system will then rotate cable drums 85 and forcibly draw the closure and carriages down to a snug, flush fit over the cockpit.

The release means for unlocking the cable drums 85 consists of a knockout plate element 130 (Figures 6, 7 and 8) pivotally mounted on a suitable angle bracket 131 by a pivot element 132 for movement in a counterclockwise direction against a spring 133 and normally prevented from opposite movement by an adjustable stop element 134 fixed to the bracket. The knockout element is positioned in the path of movement of an operating arm 135 on the locking means 87. However, the element 130 is only effective, in conjunction with the stop element 134, to trip the lock 87 when the same is moved by the cable 106 to the left in Figures 7 and 8, as the reverse movement thereof, which corresponds to opening of the cockpit, will simply bias the element 130 out of the way against the action of spring 133. The normal direction of movement of the assembly 80 as seen in Figures 7 and 8 for opening the closure 17, assuming that the latter has been elevated, is toward the right so that the arm 135 of the locking means 87 must pass through the zone of the knockout element 130. Consequently, the return movement of the assembly 80 will carry the arm 135 against the element 130 but due to the stop 134 the element 130 is prevented from pivoting and arm 135 is knocked down, effecting a pivoting movement of the means 87 in a clockwise sense which lifts the arm 100 out of the notch 101 in catch 102.

The above detailed description relates to a preferred construction and assembly arrangement of a detachable and movable cockpit closure for aircraft, but it is to be understood that the same is not to be limited thereto as modifications may be made or equivalent means may be used without departing from the spirit and scope of the invention as defined in the claims appearing hereinafter.

What is claimed is:

1. In an aircraft fuselage structure having a cockpit, a closure normally movable from a closed seated position over the cockpit and flush with the fuselage structure to a retracted open position rearwardly of the cockpit, carriage means on which said closure is mounted, guide means for said carriage, said guide means having a forward upwardly inclined portion, an intermediate substantially horizontal portion and a rearward downwardly inclined portion, first roller means mounted on said carriage at a forward zone thereof for engaging the forward inclined portion of said guide means, second roller means engageable with the intermediate portion of said guide means, elevating means operably mounted on said second roller means and connected to the rearward portion of said carriage, and closure moving means operably mounted in the cockpit and connected with said elevating means whereby said latter means may be operated first to elevate the rear portion of said closure from its closed flush position and thereafter to move said closure to retracted position, the movement of said closure toward retracted position being accompanied by an upward movement at the forward portion thereof, due to said inclined forward guide portion, sufficient to elevate the closure for clearing the fuselage structure.

2. In an aircraft having a fuselage structure providing a cockpit, a closure movable from a closed seated position over the cockpit and flush with the fuselage structure to an open and retracted position rearwardly of the cockpit, carriage means for mounting said closure on the aircraft, said carriage means including forwardly located trucks and rearwardly located trucks, closure elevating means operably mounted on said rearwardly located trucks, guide tracks on which said forwardly and rearwardly located trucks ride, said guide tracks being formed to provide forward sections which are upwardly rearwardly inclined for elevating the forward portion of said closure, and means operably connected to said elevating means first for moving the rearward portion of said closure to elevated position and then to move said closure bodily to its retracted position rearwardly of the cockpit.

3. In an aircraft having a fuselage structure providing a cockpit, a sheddable closure movable from a position flush at its forward and rearward margins with the adjacent margins of the fuselage structure and seated over the cockpit to a retracted position overlying the fuselage structure rearwardly of the cockpit, carriage structures positioned at each side of the cockpit, toothed elements on each of the carriage structures, toothed elements on said closure for engaging said first toothed elements, means for releasably holding said toothed elements in engagement whereby said closure may be moved between its respective positions, means mounted on the aircraft at each side of the cockpit for the support and guidance of said carriage structures, means for propelling said carriage structures along said support and guiding means, and means connected to said holding means and operable to release the same thereby permitting disengagement of said toothed element and shedding of said closure.

4. In an aircraft having a fuselage formed with a cockpit, a closure for the cockpit which is movable normally from a seated position closing the cockpit to a rearward position for opening the cockpit, closure carriages movably positioned one at each side of the cockpit and to which said closure is detachably secured for emergency opening of the cockpit, means on said closure for effecting its emergency detachment, track members secured to the fuselage one at each side of said cockpit for guiding said closure in a predetermined path of movement, a first pair of trucks movably mounted one on each of said track members and having a pivotal connection with said closure near its forward margin, a second pair of trucks movably mounted one on each of said track members, means operably mounted on each of said second trucks and connected to said closure near its rearward margin for elevating the latter preparatory to its movement to its rearward position, cable means operably arranged on the fuselage and having a connection with each of said elevating means for simultaneously operating the latter to elevate the rear margin of said closure, means on said second trucks for locking each of said elevating means in elevated position and thereafter causing said cable means to initiate rearward movement of the closure, and means on the fuselage in the path of movement of each of said locking means when the latter is moved with said closure toward cockpit closed position for unlocking the same, whereby said closure may again be located in seated position closing the cockpit.

5. In an aircraft having a cockpit, a longitudinally extending track on the aircraft on each side of the cockpit, each track having an intermediate portion and at each end of such intermediate portion having downwardly inclined portions, a cover for the cockpit having on each side thereof a pair of spaced means for engaging thereon between closed and open positions, one the adjacent track for longitudinal movement means of each pair in the closed position engaging one of said inclined track portions and movable onto said intermediate track portion during cover opening, the second means of each pair in the closed position engaging said intermediate track portion and movable onto the other inclined track portion during cover opening, operating means for moving the cover between opened and closed positions, and means operable by said operating means for elevating the cover relative to said second track engaging means upon the initiation of closure opening movement.

6. In an aircraft having a cockpit and a track extending therealong, a cockpit cover having track engaging means and movable along the track between closed and opened positions, cable means extending along the track for operating the cover between said positions, and means actuated by the cable means for raising the cover relative to said track engaging means at the initiation of cover opening movement of the cable means and for lowering the cover relative to said track engaging means at the termination of cover closing movement of the cable means.

7. In an aircraft having a cockpit and a track extending therealong, a cockpit cover having a pair of spcaed track engaging means and movable along the track between closed and opened positions, means for operating the cover between opened and closed positions, and means actuated by said operating means for raising and lowering the cover relative to one of said track engaging means at the initiation of cover opening movement and at the termination of cover closing movement, respectively, the cover pivoting about the other of said track engaging means during such raising and lowering movements.

8. In an aircraft having a cockpit and a track extending therealong, a cockpit cover having track engaging means and movable along the track between opened and closed positions, means for operating the cover along the track between said positions, and means actuated by said operating means for raising the cover relative to said track engaging means at the initiation of cover opening operation and for lowering the cover relative to the track engaging means at the termination of cover closing operation.

9. In an aircraft having a cockpit and a track extending therealong, a cockpit cover having track engaging means arranged for movement with the cover along the track between opened and closed positions, a cable extending along the track and movable for shifting the cover between said positions, a drum around which the cable extends and carried by said track engaging means, and means operated by drum rotation for raising the cover relative to the track engaging means at the initiation of cover opening movement of the cable.

10. In an aircraft having a cockpit and a track extending therealong, a cockpit cover having track engaging means arranged for movement with the cover along the track between opened and closed positions, a cable extending along the track and movable for shifting the cover between said positions, a drum around which the cable extends carried by said track engaging means, and means connecting the cover to an eccentric element movable with the drum for raising the cover relative to the track engaging means at the initiation of cover opening movement of the cable.

11. In an aircraft having a cockpit and a track extending therealong, a cockpit cover having track engaging means arranged for movement with the cover along the track between opened and closed positions, a cable extending along the track and movable for shifting the cover between said positions, a drum carried by said track and around which the cable extends whereby movement of the cable may effect bodily movement or rotational movement of the drum, means effective upon rotational movement of the drum for elevating or lowering the cover relative to the track engaging means, means for locking the drum against rotation after cover elevating movement thereof at the initiation of cover opening cable movement, and means for releasing the locking means at the termination of cover closing cable movement.

12. In an aircraft having a cockpit and a cover member extending thereover, a support for the cover extending longitudinally along each side of the cockpit and movable longitudinally along the aircraft to provide for normal opening and closing movements of the cover, the cover and each of the supports having interengaging tapered tooth formations extending therealong for holding the cover against longitudinal shifting relative to said supports, a lug depending from the cover adjacent each end of each support, a pair of tongs associated with each of said lugs, said tongs being carried by the supports and gripping the lugs for holding the cover against vertical displacement from the supports thereby maintaining the interengagement of said toothed formations, the lugs having cam faces engaged by the tongs for urging opening of the latter upon initial vertical displacement of the cover from the supports, and locking means holding the tongs closed and operable to effect substantially simultaneous release of all of said tongs to provide for jettisoning of the cover.

13. In an aircraft having a cockpit and a cover member extending thereover, a support for the cover extending longitudinally along each side of the cockpit, the cover and each of the supports having interengaging tapered tooth formations for holding the cover against longitudinal shifting relative to said supports, a lug depending from the cover adjacent each end of each support, a pair of tongs associated with each of said lugs, said tongs being carried by the supports and gripping the lugs for holding the cover against vertical displacement from the supports thereby maintaining the interengagement of said toothed formations, the lugs having cam faces engaged by the tongs for urging opening of the latter upon initial vertical displacement of the cover from the supports, and locking means holding the tongs closed, said locking means being operable to effect substantially simultaneous release of all of said tongs to provide for jettisoning of the cover.

ARTHUR E. ULRICH.
HAROLD F. HUME.
CARLO J. ARCARESE.
FREDERICK I. STEELE.

REFERENCES CITED

The following references are of record in the file of this patent:

UNITED STATES PATENTS

| Number | Name | Date |
|---|---|---|
| 2,125,752 | Saulnier | Aug. 2, 1938 |
| 2,332,158 | Magill | Oct. 19, 1943 |
| 2,361,113 | Lobella | Oct. 24, 1944 |
| 2,385,493 | Bowens | Sept. 25, 1945 |
| 2,424,245 | Martin | July 22, 1947 |

FOREIGN PATENTS

| Number | Country | Date |
|---|---|---|
| 556,285 | Great Britain | Sept. 28, 1943 |